Figure 1:
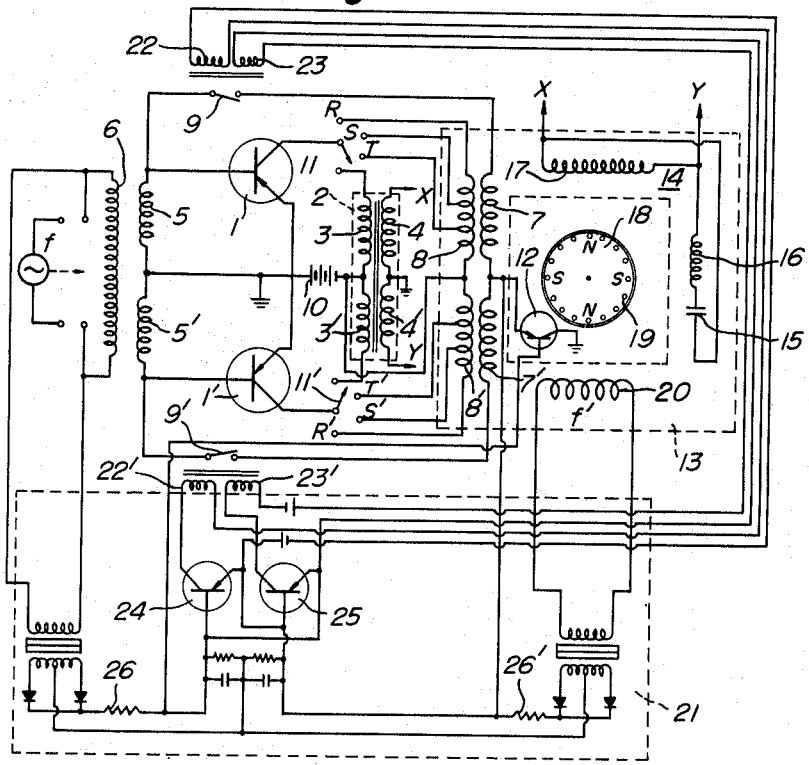

May 3, 1966   SHINE YASUOKA ETAL   3,249,837
SYNCHRONOUS MOTOR
Filed Dec. 11, 1962

Inventors
Shine Yasuoka
Yutaka Tanaka
By Stevens Davis Miller & Mosher
Attorneys

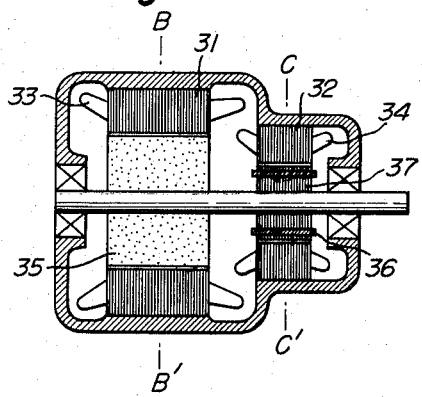
Fig. 4a
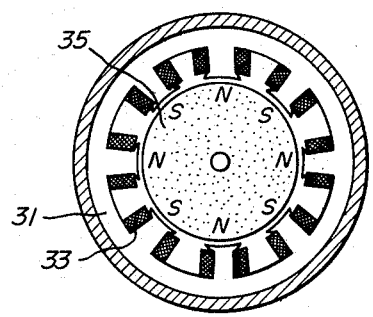
Fig. 4b
Fig. 4c
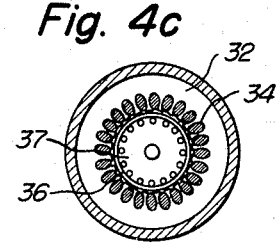
Fig. 5b
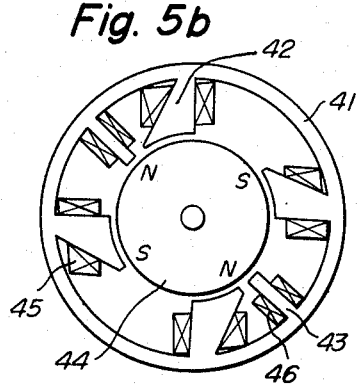
Fig. 5a
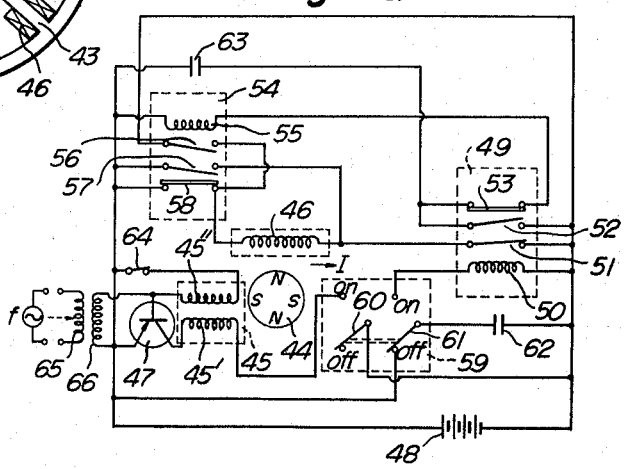
Inventors
Shine Yasuoka
Yutaka Tanaka

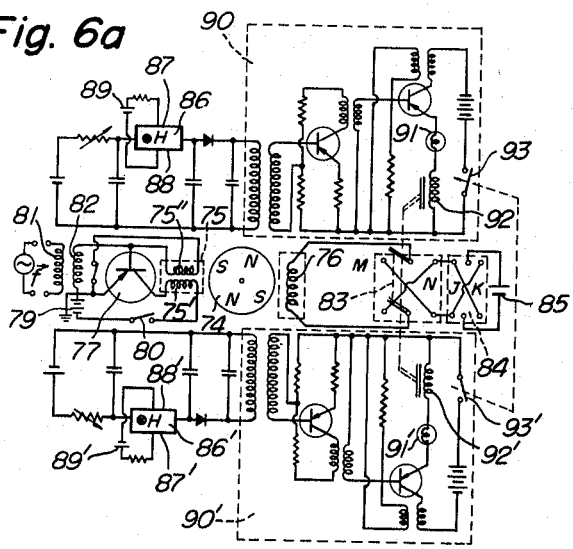
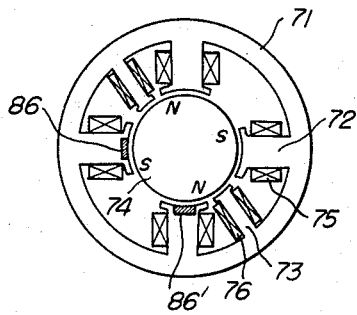
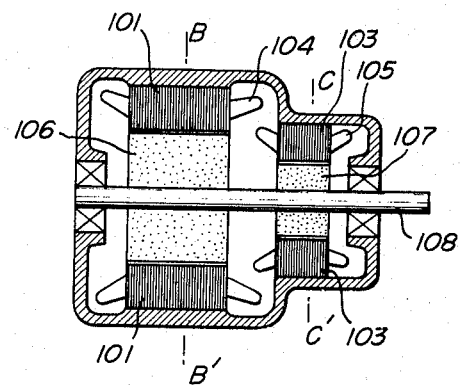
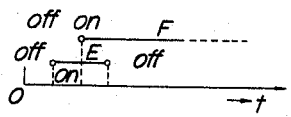

Inventors
Shine Yasuoka
Yutaka Tanaka
By Stevens, Davis, Miller & Mosher
Attorneys

United States Patent Office 3,249,837
Patented May 3, 1966

3,249,837
SYNCHRONOUS MOTOR
Shine Yasuoka, Toyonaka-shi, and Yutaka Tanaka, Kobe, Japan, assignors to Matsushita Electric Industrial Co., Ltd., Osaka, Japan, a corporation of Japan
Filed Dec. 11, 1962, Ser. No. 243,958
Claims priority, application Japan, Dec. 12, 1961, 36/45,260; Dec. 27, 1961, 36/47,706, 36/47,707; Mar. 24, 1962, 37/11,880
15 Claims. (Cl. 318—176)

This invention relates to a method of controlling the rotating speed of a variably synchronized motor in accordance with external signal frequencies, and variably synchronized motor adapted for carrying out the above method.

According to the invention, a switch element, such a transistor, semi-conductor rectifier with control electrode, vacuum tube, thyratron, etc., is controlled of its switching operation by an external synchronizing signal having a variable frequency, for controlling the frequency of field winding current of a synchronized motor having a permanent magnet rotor, which is driven with a synchronous rotating speed corresponding to the external signal frequency, and thereafter, the synchronized motor is controlled of its rotating speed that varies depending upon the frequency change of the external signal, and rotated at a synchronous speed corresponding to the external signal frequency irrespective of load applied thereon. The present invention contemplates also such variable synchronized motor that may be employed for carrying out the above-outlined method of control.

The primary object of the present invention is to provide a control method in which a synchronized motor is energized from a direct current source at a rotating speed synchronized with the frequency of an external synchronizing signal, the synchronous rotation being maintained over a wide range of frequency change of the external synchronizing signal, the rotating speed changes promptly following the frequency change of external signal, thus enabling a smooth synchronous speed control by a simple method over a wide range from a low speed to an extremely high speed rotation.

It is another object of the present invention to provide a synchronized motor adapted for carrying the above-mentioned method of control into practice.

A further object of the present invention is to provide a speed control which enables the use of a direct current motor of non-brush, non-commutator type for synchronous drive, with decreased mechanical loss, prolonged life of motor, as well as easy maintenance.

Figure 2:
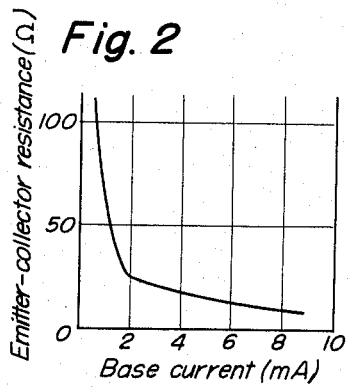
Figure 3:
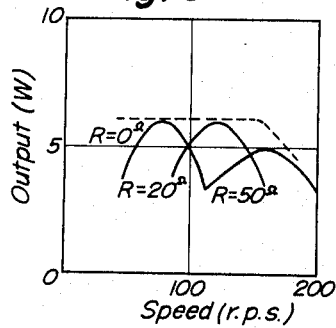
Figure 7B:
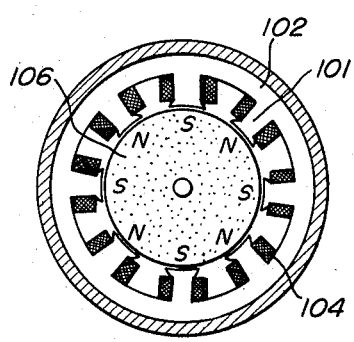
Figure 7C:
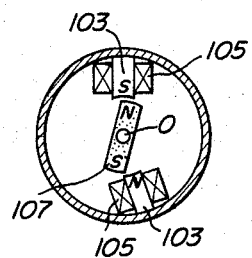

There are other objects and particularities of the present invention, which will be made obvious from the following detailed description of the invention with reference to the accompanying drawings, in which:

FIG. 1 is a diagrammatic representation of one embodiment of the present invention; FIG. 2 is a characteristic curve of the motor speed controlling transistor shown in FIG. 1, showing the relation between the emitter-collector resistance and the base current; FIG. 3 is a characteristic curve of the motor speed controlling transistor showing the relation between the emitter-collector resistance and the rotating speed of the motor; FIG. 4a is a longitudinal sectional view of a motor embodying the present invention; FIG. 4b is a sectional view taken at line B–B' in FIG. 4a; FIG. 4c is a sectional view taken at line C–C' in FIG. 4a; FIG. 5a is a schematic diagram of another embodiment of the invention; FIG. 5b is a diagrammatic front elevational view of the motor shown in FIG. 5a; FIG. 6a is a diagram showing a further embodiment of the invention; FIG. 6b is a diagrammatic front elevational view of the motor shown in FIG. 6a; FIG. 6c shows the switching sequence of contacts shown in FIG. 6a; FIG. 7a is a longituduinal sectional view of the motor according to another embodiment of the invention; FIG. 7b is a sectional view taken at line B–B' in FIG. 7a; FIG. 7c is a sectional view taken at line C–C' in FIG. 7a; FIGS. 8, 9, 10 and 11 show respectively four further embodiments of the invention.

Referring to FIG. 1, a pair of transistors 1 and 1' are connected together in push-pull, and a transformer 2 comprises primary windings 3, 3' and secondary windings 4, 4'. First control windings 5 and 5' are coupled with an input winding 6, and second control windings 7 and 7' are coupled in positive feedback with field windings 8 and 8' having taps R, S, T and R', S', T', respectively. The first control windings 5 and 5' are respectively connected between the emitters and bases of transistors 1 and 1', and in parallel with the respective first control winding 5 and 5', the second control windings 7 and 7' are connected through contacts 9 and 9', respectively. The primary windings 3 and 3' of transformer 2 are connected with a direct current source 10 between the emitters and collectors of respective transistors 1 and 1' through change-over switches 11 and 11', respectively. The field windings 8 and 8' are respectively connected in parallel with the primary windings 3 and 3' of transformer 2 through the change-over switches 11 and 11', respectively. In addition, a speed controlling transistor 12 is interposed between the second control windings 7 and 7' and the emitters of transistors 1 and 1', respectively, the emitter of transistor 12 being connected to the common connection point of the second control windings 7 and 7', while the collector thereof being connected to the emitters of transistor 1 and 1'.

The push-pull circuit formed by transistors 1, 1', first control windings 5, 5', change-over switches 11, 11', and D.C. source 10, second control windings 7, 7', field windings 8, 8', constitutes a positive feedback transistor circuit. An external signal of frequency is applied across the input winding 6.

The field windings 8, 8' and the second control windings 7, 7' are wound on respective poles of the stator core 13 of a variable synchronized motor of the invention, and electric current flowing through the field windings 8, 8' magnetizes the stator poles. Series-connected capacitor 15 and auxiliary winding 16 are connected in parallel with a winding 17 to form a stator winding of an ordinary induction motor for starting, which is a single-phase induction motor, and is disposed on the stator core 13, its terminals X and Y being connected to the corresponding terminals of secondary windings 4 and 4' of transformer 2, whereby the A.C. output of transformer 2 is applied to the starting winding for producing a rotating magnetic field in the stator core 13. The motor comprises a permanent magnet rotor 18 provided with squirrel-cage type winding 19 formed integral therewith. The rotation of permanent magnet rotor induces a voltage in the second control windings 7, 7'. In addition, a frequency detecting winding 20 is wound on the stator field core 13, and produces a current of frequency corresponding to the number of rotations of rotor 18. Further, a frequency comparator circuit 21 is provided for producing a voltage corresponding to the difference ($f'-f$) between the external signal frequency ($f$) and the frequency ($f'$) of the voltage induced in the detecting winding 20. The ($f'-f$) voltage is applied across the emitter and the base of the speed controlling transistor 12. The output of frequency comparator circuit 21 is connected to the relay windings 22, 22' and 23, 23', which are deenergized when the rotor 18 is rotating at a synchronous speed just corresponding to the frequency of external signal. When the rotor 18 is out-of-synchronism, the detecting winding 20 generates a voltage of frequency (f') and the output voltage of frequency comparator 21 is applied across one or the other of transistors 24 and 25, between the emitter and the base thereof, to render the same conductive for energizing relay windings 22 and 22' or 23 and 23', depending upon whether f' is higher or lower than f.

The contacts 9 and 9' are made open when relay windings 22, 22' and 23, 23' are not energized, but are closed when relay windings 22, 22' or 23, 23' are energized.

The first control windings 5, 5' can be connected in series with the second control windings, respectively, in which case contacts 9, 9' are not necessary.

The relation between the emitter-collector resistance and the base current of speed controlling transistor 12 is shown in FIG. 2 which shows that the emitter-collector resistance decreases as the base current increases. In addition, the emitter-collector resistance of transistor 12 forms the base resistance of the push-pull circuit of transistors 1 and 1', and by varying this base resistance, the rotating speed of the afore-mentioned motor can be changed. The relation between the above-mentioned base resistance of transistors 1, 1' and the rotating speed of the motor is shown in FIG. 3, the rotating speed increases as the resistance increases. When the permanent magnet rotor 18 has not yet reached the synchronous speed corresponding to the external signal frequency, the bias voltage between the emitter and the base of the transistor 12 is relatively low, and the base current is correspondingly low, so that the emitter-collector resistance increases to raise the rotating speed of rotor 18. On the contrary, when the rotating speed of rotor 18 exceeds the synchronous speed corresponding to the external signal frequency, the forward bias voltage between the emitter and the base of the speed controlling transistor 12 increases to correspondingly increase the base current, resulting in lowering of the rotating speed of rotor 18. The rotating speed of rotor 18 is thus automatically adjusted to be kept synchronized with the external signal frequency. The bias voltage applied between the emitter and the base of the speed controlling transistor 12 can be adjusted by appropriately varying the resistance 26 and 26' in the frequency comparator circuit 21.

The sequence of operation for controlling the speed of rotor 18 will now be described. First, for starting, the change-over switch 11, 11' are closed to connect the collector of transistors 1, 1' to transformer primary windings 3, 3', respectively, and the external signal applied across the input winding 6 is amplified by transistors 1, 1', and the starting winding 14 is energized from the secondary output X, Y to produce a rotating magnetic field in the stator field core 13 for starting the rotor 18. When the external signal of frequency f is applied across the input winding 6 at the starting, relay windings 23 and 23' are also energized to close contacts 9 and 9'. As the rotor 18 is rotated, voltage is induced in the second control windings 7 and 7', and applied to transistors 1 and 1', respectively, as base control voltages. Consequently, if the change-over switches 11 and 11' are changed to taps R and R', S and S', or T and T', respectively, of field windings 8 and 8', transistors 1, 1' become conductive and non-conductive alternately according to the induced voltages in the second control windings 7, 7'. When transistor 1 or 1' is conductive, the current flowing through field winding 8 or 8' excites the poles of stator core 13 to apply torque to the permanent magnet rotor 18, and gradually raises its rotating speed. Thus, when S-poles of rotor 18 approach the second control winding 7 or when N-poles of rotor 18 go away from the second control winding 7, the voltage induced in winding 7 renders transistor 1 conductive, and at this time, the current flowing through field winding 8 attracts S-poles of rotor 18 and repulses N-poles thereof, according to appropriate sense of winding of the second control winding 7 and the field winding 8. The second control winding 7' and the field winding 8' are wound in such a sense that, when N-poles of rotor 18 approach the second control winding 7' or S-poles of rotor 18 go away from the winding 7', the voltage induced in winding 7' renders transistor 1' conductive, and at this time, the current flowing through field winding 8' attracts N-poles of rotor 18 and repulses S-poles of the same.

On the other hand, the frequency detecting winding 20 generates voltage of frequency (f') corresponding to the rotating speed of rotor 18, which is compared with the external signal frequency in the comparator circuit 21, and the output voltage of the latter with a frequency difference (f'−f) energizes relay windings 22, 22' or 23, 23' to keep contacts 9, 9' closed. The base current of speed controlling transistor 12 is automatically adjusted as hereinbefore described, and its emitter-collecter resistance, that is, the base resistance of the push-pull circuit of transistors 1, 1' changes as shown in FIG. 2. As a result, the rotating speed of rotor 18 changes as shown in FIG. 3, the rotating speed being raised when it is lower than the synchronous speed corresponding to the external signal frequency, while lowered when it is higher than the synchronous speed by some reason. The rotating speed of rotor 18 may be varied by selectively changing the switches 11, 11' to taps R and R', S and S' or T and T', of field windings 8, 8', respectively. These taps are selected appropriately according to the valve of external signal frequency.

When the rotating speed of rotor 18 has come to the synchronous speed substantially corresponding to the external synchronizing signal frequency, electric currents flowing through relay windings 22, 22', 23, 23' decrease remarkably to open the contacts 9 and 9'. Consequently, the external synchronizing signal applied to input winding 6 is subjected to an amplifying effect of the circuit formed by transistors 1, 1', first control windings 5, 5', switches 11, 11', field windings 8, 8' and direct current source 10, and magnetizing current is supplied to field windings 8, 8', for pulling rotor 18 into synchronism with the external synchronizing signal frequency. The voltages induced in the first control windings 5, 5' coupled with the input winding 6 render the transistors 1, 1' conductive and non-conductive alternately with the external synchronizing signal frequency. When the transistor 1 or 1' conducts, the current flowing through the corresponding field winding 8 or 8' excites the poles of stator core, changing their polarities alternately to synchronize the rotor with the external synchronizing signal frequency. Thereafter, the synchronous speed is maintained regardless of the load conditions.

According to the present invention, once the permanent magnet rotor 18 has been synchronized with the external synchronizing signal frequency, even if the synchronizing frequency varies over a wide range, the rotor follows such a change promptly to maintain synchronous rotation with the changed frequency. Thus, when the external synchronizing signal applied across the input winding 6 increases in frequency, the rotating speed of variable synchronized motor also increases correspondingly, while when the frequency decreases, the rotating speed of motor promptly decreases, thus maintaining the synchronous rotation. When the external signal frequency should vary so abruptly that the rotor 18 cannot follow, resulting in stepout-of-synchronism, relay windings 22, 22' or 23, 23' would be energized again to close the contacts 9, 9' for adjusting the resistance value of speed controlling transistor 12, and the rotor 18 is synchronized again with the new external synchronizing signal frequency.

The present invention has a primary feature that, in the normal operating condition with the rotor 18 of variably synchronized motor rotating at a synchronous speed corresponding to the external synchronizing signal frequency, the rotating speed of rotor 18 is controlled to maintain the synchronous speed over a wide range of frequency change of the external synchronizing signal, but for starting the variable synchronized motor, various means can be employed. In the arrangement shown in FIG. 1, an induction starting is resorted to, in which the induction starting winding 14 is disposed on the stator core 13, together with field windings 8, 8', and a squirrel cage winding 19 is provided integral with the permanent magnet rotor 18. However, the stator field core may be divided into two parts, a main field core 31 and a starting field core 32 as shown in FIG. 4. In this case, field winding 33 disposed on main field core 31 corresponds to field windings 8, 8' in FIG. 1, and is connected in the transistor circuit, and induction starting winding 34 disposed on starting field core 32 corresponds to the winding 14 in FIG. 1. A permanent magnet rotor 35 cooperates with the main field winding 33, while a squirrel cage rotor 36 cooperates with starting winding 34, both rotors being mounted on a common shaft.

When an external A.C. source is available for direct connection to the induction motor for starting, transformer 2 in FIG. 1 may be omitted, and the external A.C. source may be connected to the terminals X, Y of the winding 14 to start the motor. Alternatively, a starting torque may be applied to the permanent magnet rotor 18 by some other means, not shown, and in such a case, transformers 2 and the winding 14 are not required in the arrangement shown in FIG. 1.

Speed controlling transistor 12 in FIG. 1 constitutes means for bringing the rotating speed of permanent magnet rotor 18 towards the synchronous rotating speed in the course of synchronizing the rotor with the external synchronizing signal frequency, but the transistor 12 can be substituted with a resistance inserted in place of emitter-collector of the transistor, the value of such resistance being automatically adjusted by electro-mechanical means in accordance with the output voltage of the frequency comparator circuit 21. However, the use of speed controlling transistor 12 is preferable, because of the fact that it is purely electronic means having no moving part, and that an extremely small output of the frequency detecting winding 20 can effect the necessary variation of base current of the transistor 12 for changing the internal resistance of the same to effectively attain the required change in rotating speed of the rotor 18.

The variable synchronized motor can also be started by providing main magnetic poles and auxiliary poles on the stator field core, and by exciting the auxiliary poles in a suitable manner to apply starting torque to the permanent magnet rotor 18. In such a case, the starting winding 14 and the squirrel cage winding 19 are not required in the arrangement shown in FIG. 1. Thus, in FIG. 5, the stator field core 41 is provided with main magnetic poles 42 and starting interpoles 43. The main poles 42 have main field windings 45 wound thereon, while the starting poles 43 have starting windings 46 wound thereon. Main field winding 45 comprises a field winding proper 45', and a second control winding 45" as shown in FIG. 5a. The second control winding 45" is connected between emitter and base of the transistor 47, and the field winding proper 45' is connected between the emitter and the collector of the transistor 47 through a change-over switch 59 and a D.C. source 48 to form a transistor-motor circuit. Between the emitter and base of the transistor 47, a first control winding 66 is connected and is coupled with an input winding 65. Thus, the transistor 47, field winding 45', and first control winding 66 form an amplifying circuit. To the input winding 65 is applied the external synchronizing signal of frequency $f$. A relay 49 comprises an actuating coil 50 and a plurality of contacts 51, 52 and 53, and a relay 54 comprises an actuating coil 55 and a plurality of contacts 56, 57 and 58. The change-over switch 59 comprises change-over contacts 60 and 61, contact 60 being in the colleter circuit of transistor 47. The D.C. source 48 is shunted by a condenser 62 which is connected across the D.C. source through the contact 61. When the contact 61 is changed to another position, the condenser 62 is connected across the relay coil 50. Across the D.C. source 48 also, the starting winding 46 is connected through relay contacts 51 and 58, and a condenser 63 is connected through relay contacts 52. The starting winding 46 and relay contact 58 are shunted by relay contact 57, while the starting winding 46 and relay contact 51 are shunted by relay contact 56.

While, in FIG. 1, the energizing circuit of field winding is formed by a push-pull circuit of two transistors, in FIG. 5a, the energizing circuit is formed by a single transistor regenerative circuit employing one transistor. Either of them can be used, but the push-pull circuit is preferable, because it provides relatively broad range of synchronization, as well as higher efficiency.

FIG. 5a shows the condition just before starting. Change-over switch contacts 60 and 61 are "off," and the condenser 62 is charged, contacts 53, 58 and 64 are closed, and contacts 51, 52, 56 and 57 are open. Each magnetic pole of permanent magnet rotor 44 is fixed at such a position that it is in opposition to one of main field poles 42 at the minimum magnetic energy point. When the switch contacts 60 and 61 are changed over to "on" positions, respectively, transistor 47 is connected to D.C. source 48, and at the same time, condenser 62 is discharged through relay coil 50 to energize the latter, whereupon contacts 51 and 52 are closed, and contact 53 is open. As a result, current flows from D.C. source 48 through starting winding 46 in the direction shown by arrow (I) to excite starting poles 43 of the stator core, and condenser 63 is charged from D.C. source 48. When the condenser 62 has discharged substantially instantaneously, contacts 51 and 52 return to open positions, and contact 53 to closed position, whereupon condenser 63 discharges through relay coil 55 to energize the same substantially instantaneously. Relay contacts 56 and 57 are thus closed and relay contact 58 open. As a result, current flows from D.C. source 48 through starting winding 46 in the direction opposite to arrow (I) by way of now-closed contacts 57 and 56. When condenser 63 has discharged, relay contact 58 returns to closed position, and contacts 56 and 57 to open positions, and starting winding 46 is deenergized.

Assuming that starting poles 43 are magnetized to N-polarities for a short and definite interval of time at the beginning, and then magnetized to S-polarities for the next similar time interval, according to the above-described energization of winding 46 in one direction and the other, if N poles of permanent magnet rotor 44 were in opposition to starting poles 43 at the beginning when starting poles 43 were magnetized to N-polarities, repulsive forces can be produced therebetween to apply strong torques to the permanent magnet rotor 44 to drive the latter in the clockwise direction. This causes a voltage induced in the second control winding 45" to control the switching operation of transistor 47, and the main field poles 42 are excited to drive the rotor 44 continuously. Consequently, when starting interpoles 43 are next magnetized to S-polarities, they do not affect substantially the rotor 44. If S poles of permanent magnet rotor 44 were in opposition to starting poles 43 at the beginning when starting poles 43 were magnetized to N-polarities, attractive forces can be produced therebetween to drive the rotor 44 in the counterclockwise direction. In the next short interval of time, starting poles 43 are magnetized to S-polarities as described, and the permanent magnet rotor 44 is started in the clockwise direction by the repulsive forces produced between the rotor poles S and starting poles 43, and the rotor begins to rotate. As the permanent magnet rotor begins to rotate, the second control winding 45" generates a voltage which acts to control the frequency of switching current flowing through field winding proper 45', and the rotating speed of rotor 44 is raised up. When the rotating speed of rotor 44 has approached to the synchronous speed corresponding to the external synchronizing signal frequency, the contact 64 is actuated to open whereupon the *f*-frequency current flowing through field winding proper 45' becomes predominant, and the rotor 44 is caused to rotate at the synchronous speed corresponding to the external synchronizing signal frequency. Once the rotor 44 has been synchronized as above-described, even if the external synchronizing signal frequency changes over a wide range, the rotor 44 follows promptly such a change to vary its rotating speed for maintaining the synchronous rotation. This method provides relatively large starting torque and reliability for starting the rotor in a predetermined direction.

It should be understood that relays employed in the arrangement shown in FIG. 5a may be replaced by equivalent means, such as vacuum tubes, semi-conductor devices, magnetic elements, etc. It is to be understood also that the direction of starting the permanent magnet rotor can be selected by varying the relative positions of starting auxiliary poles of the stator core.

In the arrangement shown in FIG. 5, the starting interpoles are excited in both directions alternately, without confirming which poles of permanent magnet rotor are in opposition to the main field poles when the rotor stands still. If, however, the poles of permanent magnet rotor in opposition to the main field poles can be confirmed at the beginning of starting, the starting interpoles may be excited in the appropriate direction only for accomplishing effective starting.

In the arrangement shown in FIG. 6, Hall elements are associated with the main field poles of stator core for confirming which poles of permanent magnet rotor are in opposition to the main field poles, and the starting interpoles are excited solely in the appropriate direction. Thus, in FIG. 6, a stator field core 71 is provided with main field poles 72 and auxiliary starting poles or interpoles 73. A permanent magnet rotor 74 is adapted to rotate in the stator. Main field windings 75 are wound on main field poles 72, and starting windings 76 are wound on starting interpoles 73, respectively. Main field windings 75 comprise field winding proper 75' forming a part of a transistor switching circuit, second control winding 75". The second control winding 75" is connected between the emitter and the base of a transistor 77 through contact 78, and the field winding proper 75' is connected between the emitter and the collector of the transistor 77 through a D.C. source 79 and contact 80 to form a transistor switching circuit. Between the emitter and the base of the transistor 77 is connected a control winding 82 coupled with an input winding 81 to which is applied the external synchronizing signal of frequency (*f*). The transistor 77, field winding proper 75', and control winding 82 thus form an amplifier. The starting winding 76 is connected to a D.C. source 85 through change-over switches 83 and 84. Two adjacent main field poles 72 are respectively provided with Hall elements 86 and 86' secured in the inside faces of poles. The current terminals 87, 88, and 87', 88' of respective Hall elements 86 and 86' are connected across D.C. sources 89 and 89', respectively, to pass current in definite directions. The Hall elements are also subjected to magnetic fields (H) of the permanent magnet rotor 74. As a result, a voltage is produced across the Hall terminals of each Hall element, and this Hall voltage is amplified by an amplifier 90 or 90' which in turn supplies energizing current to indicator 91 or 91' and relay winding 92 or 92' for actuating change-over switch 83 to M- or N-position. The amplifying circuits 90 and 90' are provided with contacts 93 and 93', respectively, for rendering the circuits operative. In FIG. 6c, the circuit condition is shown when contacts 80 and 93, 93' are closed. Contacts 93 and 93' are ganged together, and are kept closed for a definite interval of time at the beginning of starting, as shown by line E in FIG. 6c, and contact 80 is closed slightly after contacts 93 and 93' are closed, as shown by line F in FIG. 6c.

The Hall elements 86 and 86' supply the Hall voltages to the amplifying circuits 90 and 90' as their effective input voltage, when they are in opposition to definite poles (N or S) of the permanent magnet rotor, but when the Hall elements are in opposition to reverse polarity poles of permanent magnet rotor, they do not supply effective input voltage to the amplifying circuits. Since the two Hall elements 86 and 86' are on adjacent two main field poles 72, they are always in opposition to different-polarity poles of the permanent magnet rotor, respectively, assuring that one or the other of two amplifying circuits 90 and 90' is supplied with effective input to operate. Depending upon which amplifying circuit 90 or 90' operates, the change-over switch 83 is actuated to M-position or N-position selectively, and the starting winding 76 is energized in such a direction that starting interpoles 73 are magnetized to the proper polarity for starting the rotor 74.

FIG. 6a shows the circuit condition just before the variable synchronized motor is to be started, with contact 78 closed and contacts 80 and 93, 93' open. Respective poles of permanent magnet rotor 74 are in opposition to main field poles 72 at the minimum magnetic energy points. For starting operation, the change-over switch 84 is operated to either J or K position, and contacts 93 and 93' are closed to operate amplifiers 90 and 90'. At this time, if the Hall element, say 86, is in opposition to S-pole of the permanent magnet rotor 74, the Hall voltage produced in element 86 renders amplifying circuit 90 operative to actuate the indicator 91 and also to energize relay winding 92 for actuating the switch 83 to, say, M-position. The starting winding 76 is thus energized from D.C. source 85 in such a direction that starting interpoles 73 are excited in a proper sense for starting the rotor 74. The direction of rotation is dependent upon whether the switch 84 is at J or K position. If, however, the angular position of rotor 74 at standstill was 90 degrees displaced from that shown in FIG. 6b, the Hall voltage of element 86' renders the amplifying circuit 90' operative to energize indicator 91' and relay winding 92' which in turn actuates change-over switch 83 to N-position for exciting starting interpoles 73 in the proper direction for starting the rotor 74. Slightly after contacts 93 and 93' have been closed, contact 80 is closed to complete the switching circuit formed by transistor 77, field winding 75', second control winding 75", and D.C. source 79, by means of which the voltage induced in the second control winding 75" by virtue of the rotation of rotor 74 controls the frequency of current flowing through field winding 75' for raising the rotating speed of rotor 74. When the rotating speed is increased and has approached the synchronous speed corresponding to the external synchronizing signal frequency (*f*), contact 78 is operated to open position, whereupon the *f*-frequency current becomes predominant in the field winding proper 75', and the rotor 74 is stepped into synchronism with the external synchronizing signal frequency (*f*), and thereafter, the rotor 74 follows synchronous rotation even if the external synchronizing signal frequency (*f*) varies over a wide range. A predetermined time after the starting, contacts 93 and 93' are opened.

The main field poles and starting interpoles may be disposed on separate stator cores and cooperate with separate main and starting permanent magnet rotors, respectively. Thus in FIG. 7, main field poles 101 are formed on main stator core 102, while starting poles 103 are formed separately. Main field poles 101 carry main field windings 104, and starting poles 103 carry starting windings 105, respectively. The starting poles and starting windings 105 thereon are not disposed in diametrical alignment, but slightly displaced from alignment as shown in FIG. 7c. A main permanent magnet rotor 106 is placed in opposition to main field poles 101. Coaxial with the main rotor 106, a starting permanent magnet rotor 107 is mounted on a common shaft, and is disposed in opposition to poles 103. The main and starting poles are fixed to the common shaft, the relative positions therebetween are as shown in FIGS. 7b and c, and the operations of main field windings 104 and starting windings 105 are similar to those of main field winding 45 and starting winding 46 of the arrangement shown in FIG. 5a.

It is to be understood that starting poles 103 are not necessarily displaced from each other with respect to a diameter as shown in FIG. 7c, but may be in diametrical alignment.

The speed control effected before the permanent magnet rotor comes near to the synchronous speed corresponding to the external synchronizing signal frequency in the arrangement of FIG. 1, is to feed back positively the voltage generated as the rotor rotates to the transistor circuit, and to raise the rotating speed of the rotor, and at the same time, to adjust the base resistance of the transistor switching circuit. However, the second control windings 7 and 7' can be omitted in FIG. 1, in which case A.C. voltage is applied to the starting winding 14 for producing a rotating magnetic field to drive the permanent magnet rotor 18 having a squirrel cage winding and to accelerate the same near to the synchronous speed corresponding to the external synchronizing signal frequency ($f$).

In the arrangments of FIG. 5a and FIG. 6a, permanent magnet rotors 44 and 74 are stepped into synchronism with the external synchronizing signal frequency ($f$) upon opening of contacts 64 and 78, respectively. Such a contact can be manually operated, but instead, it can be operated automatically responsive to a control signal obtained by comparing the rotating speed of the rotor with the synchronous speed corresponding to the external synchronizing signal frequency ($f$), for opening the contact when the control signal shows that the rotor speed has come near to the synchronous speed, and closing the same when the control signal shows that the rotor speed is far different from the synchronous speed.

In the arrangement of FIG. 1, the rotating speed of rotor 18 and the synchronous speed corresponding to the external synchronizing signal frequency ($f$) are compared with each other by use of frequency comparator circuit 21, but the latter can be substituted by a detecting circuit or voltage comparator circuit for accomplishing equivalent result.

Figure 8:
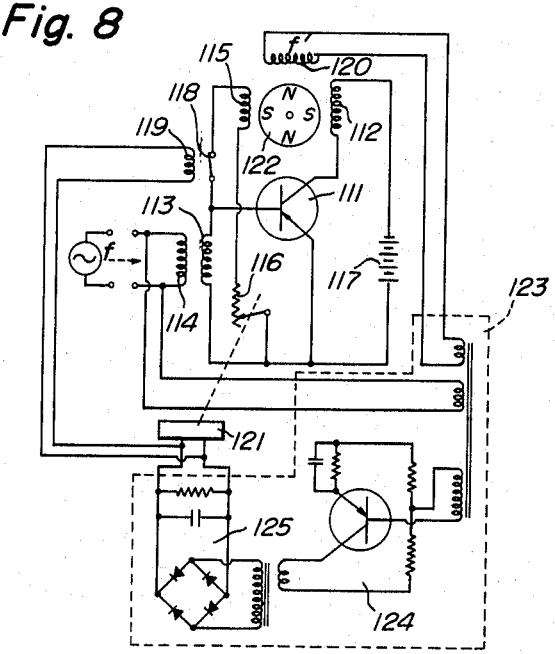

Thus in FIG. 8, an arrangement employing a detecting circuit is shown. Transistor 111, field winding 112, first control winding 113 magnetically coupled with input winding 114, and second control winding 115, are of similar constructions and functions with those shown in FIG. 1, respectively. A speed controlling variable resistance 116 is connected in series with the second control winding 115, and the field winding 112 is energized from a D.C. source 117. The variable synchronized motor 122 is also provided with a detecting winding 120. These circuit elements form a circuit equivalent to one side of the push-pull circuit shown in FIG. 1, which includes also a relay contact 118 operated by a relay winding 119. The speed controlling variable resistance 116 is changed of its value by means of a servo mechanism 121. A detecting device 123 is provided and includes an amplifying circuit 124 and a detecting circuit 125.

The detecting device 123 receives input currents from the detecting winding 120, as well as from the input winding 114, and is energized in accordance with the external signal current amplitude-modulated with the frequency difference ($f-f'$) between the external synchronizing signal frequency ($f$) and the frequency ($f'$) of current induced in the detecting winding 120. The input signal thus formed is amplified by the amplifying circuit 124, and then detected by the detecting circuit 125 for operating the servo mechanism 121 which in turn adjusts the variable resistance 116. Simultaneously, the detected current is supplied to the relay winding 119.

When the permanent magnet rotor 122 is rotating at a speed much different from the synchronous speed corresponding to the external signal synchronizing frequency, the input to detecting device 123 is in modulated condition, and therefore, the output of detecting device 123 becomes so large that the relay winding 119 is effectively energized to close the contact 118, and at the same time, the servo mechanism 121 adjusts the value of resistance 116 to increase the rotating speed of rotor 122. When the rotor speed has come near to the synchronous speed, the input to detecting device is decreased to minimum in its modulation, and the output is decreased correspondingly to deenergize the relay winding 119 to open the contact 118, whereupon the field winding 112 energized by external synchronizing signal current of $f$-frequency solely controls the rotor, and the latter is stepped into synchronism with the external synchronizing signal frequency.

Figure 9:
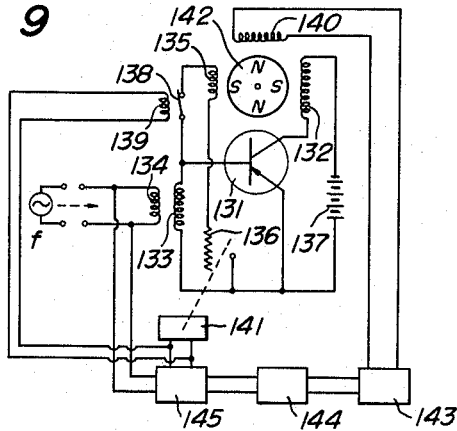

In the arrangement shown in FIG. 9, a voltage comparator circuit is employed for controlling the synchronization. Transistor 131, field winding 132, first control winding 133, input winding 134, second control winding 135, speed controlling variable resistance 136, D.C. source 137, relay contact 138 and winding 139, and detecting winding 140 associated with a permanent magnet rotor 142 of the variable synchronized motor, are all equivalent to those shown in FIG. 8. The variable resistance 136 is adjusted by a servo mechanism 141 which is operated with the output of a voltage comparator circuit 145, the input to which consists of the external synchronizing signal current of $f$-frequency, and the current induced in the detecting winding 140, amplified by an amplifying circuit 143, and then rectified by a rectifying circuit 144.

When the rotating speed of rotor 142 is far from the synchronous speed corresponding to the external synchronizing signal frequency, the output of voltage comparator circuit 145 is so large that relay winding 139 is effectively energized to close contact 138, and servo mechanism 141 adjusts the value of resistance 136 for bringing the rotor speed near to the synchronous speed. When the rotor speed has approached the synchronous speed, the output of voltage comparator decreases to deenergize relay winding 139 for opening the contact 138, whereupon the rotor 142 is stepped into synchronism with the external synchronizing signal frequency, in a similar manner as hereinbefore described.

Reverting now to the circuit construction of non-commutator, brushless direct current motor as heretofore described, besides the push-pull circuit as shown in FIG. 1 and a single circuit as shown in any of FIGS. 5, 6 8 and 9, there can be a plurality of the single circuits employed in parallel, or a flip-flop circuit, for the same purpose.

Figure 10:
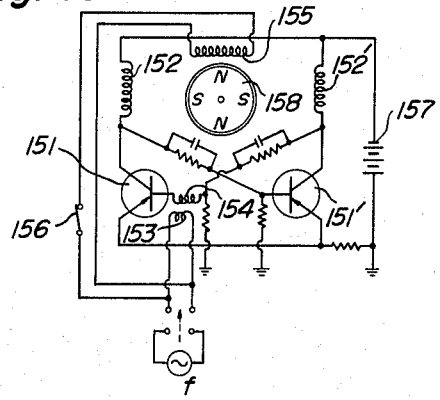

Thus in FIG. 10, a flip-flop circuit is employed for purpose. A flip-flop circuit of mono-stable type is constituted by transistors 151, 151', field windings 152, 152', first control winding 154 in magnetic coupling with input winding 153, second control winding 155, contact 156 and D.C. source 157. A permanent magnet rotor 158 is adapted to rotate under the control of windings 152, 152' and 155. The variable synchronized motor comprising rotor 158 is started with contact 156 closed. When the rotor is started, the voltage induced in the second control winding 155 is transferred to the first control winding 154 through the input winding 153. This voltage causes current to pass through the field windings 152, 152', alternately, for exciting the stator poles to apply starting torque to the rotor 158, thus accelerating the same.

When the rotor speed has come near to the synchronous speed corresponding to the external synchronizing signal frequency ($f$), the contact 156 is opened, whereupon the current of frequency $f$ becomes predominant in the field windings, and the rotor is stepped into synchronism with the external synchronizing signal frequency.

In each of the circuit arrangements hereinbefore disclosed, transistors are used as switching elements, but in place of such a transistor, semiconductor rectifier having control electrode, vacuum tube, thyratron, or other known switching element may be utilized. Thus in the arrangement shown in FIG. 11, silicon-controlled rectifier is used instead of transistor.

Figure 11:
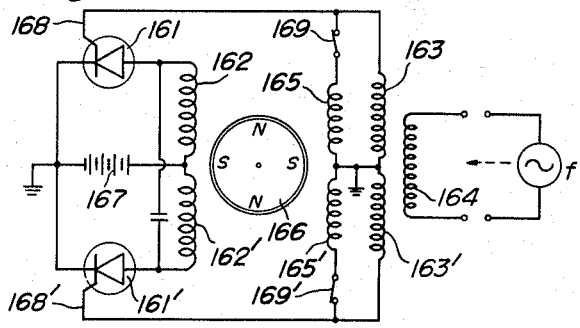

Referring now to FIG. 11, a pair of silicon rectifiers 161 and 161' are connected together in push-pull. The variable synchronizing motor system comprises field windings 162, 162', first control windings 163, 163' in magnetic coupling with input winding 164, second control windings 165, 165', and a permanent magnet rotor 166. Field windings 162, 162' and second control windings 165, 165' are disposed on a stator field core, not shown, and field windings 162, 162' are supplied from D.C. source 167, through silicon rectifiers 161, 161', respectively. First control windings 163, 163' are connected to control electrodes 168, 168' of silicon rectifiers 161, 161', respectively, and in parallel with first control windings 163, 163', respectively, second control windings 165, 165' are connected through contacts 169, 169', respectively.

The rotor 166 is started with contacts 169, 169' closed. As the rotor is started to rotate, the magnetic flux produced between N- and S-magnetic poles of the rotor intersects second control windings 165, 165' to induce therein alternating currents of opposite polarities, respectively, and positive control voltage is applied to the control electrode 168 or 168' of either one of silicon rectifiers 161, 161', and negative control voltage is applied to the other control electrode.

If positive control voltage is applied to the control electrode 168 of rectifier 161, the latter becomes conductive, and magnetizing current flows through field winding 162 to apply rotating torque to the rotor 166. Since the control electrode 168' is applied with negative voltage, rectifier 161' ceases to pass current.

As the rotor 166 continues to rotate, time comes when positive control voltage is applied to the control electrode 168' of rectifier 161', while negative control voltage is applied to the control electrode 168 of rectifier 161. Whereupon, rectifier 161 becomes non-conductive, and instead, rectifier 161' becomes conductive. Thus, exciting current flows through field winding 162' to give torque to the rotor 166.

Thus, by applying A.C. control voltage to the control electrodes 168, 168' of silicon rectifier 161, 161', large currents having frequency equal to the A.C. control voltage flow through field windings 165, 165' to give torque to the rotor. If the control voltage is supplied from the second control windings which induce A.C. voltage by virtue of rotation of rotor 166, currents flowing through field windings 162, 162' are controlled by control voltages having frequencies proportional to the instant rotating speed of rotor 166, and the rotor speed is gradually increased.

When the rotor speed has reached the synchronous speed corresponding to the external synchronizing signal frequency ($f$), the contacts 169, 169' are opened, and thereafter, magnetizing current for field windings 162, 162' are alternately caused to flow and interrupted at the frequency ($f$) of external signal which is applied to first control windings 163, 163' through input winding 164. Thus, the permanent magnet rotor 166 is synchronized with the external signal frequency ($f$) which is variable.

According to the invention, non-brush, non-commutator type, direct current variable speed, synchronized motor can be fabricated easily, which has the following performance, for example:

| | | | |
|---|---|---|---|
| Speed, r.p.m | 3,000 | 30,000 | 150,000 |
| Output, W | 80 | 10 | 30 |
| Efficiency, percent | 50 | 20 | 20 |

The rotating speed of the motor can be designed as high as 70,000 r.p.m. and more.

Further, a simple control system is provided in which speed control from about one revolution per minute up to several hundred thousand revolutions per minute can be accomplished in a smooth and positive manner, following the change in external synchronizing signal frequency. Such a performance is particularly effective and desirable in video tape recording, for example. In addition, non-brush, non-commutator type of the present motor enables to make the fabrication very simple, mechanical loss low, and maintenance easy. The present motor can be operated with a low voltage D.C. source.

What we claim as our invention is:

1. A synchronous motor comprising a field winding wound around stator field poles, a switching element whose output terminals are connected directly to said field winding in series with a D.C. electric source and whose control terminals are connected to an external signal source, thus forming at least one set of terminals of said switching circuit, a permanent magnet rotor rotatable in a magnetic field produced by excitation of said field winding, starting means for imparting initial torque to said permanent magnet rotor at a stand still condition, and a synchronizing circuit for applying a signal corresponding to the instantaneous rotating frequency of said permanent magnet rotor after its starting to the control terminals of said switching element to send a current corresponding to said instantaneous rotating frequency of permanent magnet rotor through said field winding, whereby the rotating speed of said permanent magnet rotor is drawn into synchronism with the frequency of said external signal.

2. The synchronous motor according to claim 1, in which said starting means comprises a squirrel cage type induction rotor coupled with said permanent magnet rotor, and a stator having an induction starting winding for imparting torque to said squirrel cage induction rotor.

3. The synchronous motor according to claim 1, in which said starting means comprises at least a starting interpole in opposition to said permanent magnet rotor, and a winding for magnetizing said starting interpole for a definite and short interval of time.

4. The synchronous motor according to claim 1, in which said starting means comprises a Hall element for detecting the magnetic polarity of said permanent magnet rotor with respect to said field poles at stand still, a winding excited correspondingly to the output signal of said Hall element, and a starting interpole in opposition to said permanent magnet rotor and carrying said last-mentioned winding wound thereon.

5. The synchronous motor according to claim 1, in which said synchronizing circuit comprises a winding connected to the control terminals of said switching element for inducing voltage corresponding to the instantaneous rotating frequency of said permanent magnet rotor after its starting.

6. The synchronous motor according to claim 1, in which said synchronizing circuit comprises a winding connected to the control terminals of said switching element for inducing voltage corresponding to the instantaneous rotating frequency of said permanent magnet rotor after its starting, and a resistance consisting of transistor connected to said last-mentioned winding.

7. The synchronous motor according to claim 1, in which said synchronizing circuit comprises a winding connected to the control terminals of said switching element for inducing voltage corresponding to the instantaneous rotating speed of said permanent magnet rotor after its starting, and a variable resistance connected to said last-mentioned winding.

8. The synchronous motor according to claim 1, in which said synchronizing circuit comprises a circuit including a winding connected to the control terminals of said switching element through contacts for inducing voltage corresponding to the instantaneous rotating speed of said permanent magnet rotor after its starting, to send current corresponding to the instantaneous rotating frequency of said permanent magnet rotor through said field winding, whereby the rotating speed of said permanent magnet rotor is drawn into synchronism with the frequency of said external signal.

9. The synchronous motor according to claim 1, in which said synchronizing circuit comprises a circuit including a winding connected to the control terminals of said switching element through contacts for inducing voltage corresponding to the instantaneous rotating speed of said permanent magnet rotor after its starting, to send current corresponding to the instantaneous rotating frequency of said permanent magnet rotor through said field winding, whereby the rotating speed of said permanent magnet rotor is drawn into synchronism with the frequency of said external signal, and a frequency comparator circuit for amplitude-modulating said external signal with the frequency difference between said external signal and the rotation of said permanent magnet rotor, for detecting said modulated signal, and for comparing the rotating frequency of said permanent magnet rotor with the frequency of said external signal to open and close said contacts.

10. The synchronous motor according to claim 1, in which said synchronizing circuit comprises a circuit including a winding connected to the control terminals of said switching element through contacts for inducing voltage corresponding to the instantaneous rotating speed of said permanent magnet rotor after its starting, to send current corresponding to the instantaneous rotating frequency of said permanent magnet rotor through said field winding, whereby the rotating speed of said permanent magnet rotor is drawn into synchronism with the frequency of said external signal, and a frequency comparator circuit for comparing the voltage induced along with the rotation of said permanent magnet rotor with the voltage of said external signal to compare the rotating frequency of said rotor with the frequency of said external signal for opening and closing said contacts.

11. A synchronous motor comprising a field winding wound around stator field poles, at least a set of switching circuits including a transistor, said field winding being connected directly between the emitter and collector of said transistor in series with a D.C. electric source, while external signals are applied between the base and emitter of said transistor, a permanent magnet rotor rotatable in the magnetic field established by excitation of said field winding, starting means for imparting initial torque to said permanent magnet rotor at standstill, and a synchronizing circuit for applying a signal corresponding to the instantaneous rotating frequency of said permanent magnet rotor after its starting between the base and emitter of said transistor to flow a current corresponding to the instantaneous rotating frequency of said permanent magnet rotor through said field winding, whereby the rotating speed of said rotor is drawn into synchronism with the frequency of said external signal.

12. A synchronous motor comprising a field winding wound around stator field poles, at least a set of switching circuits including a silicon control rectifier, said field winding being connected direct between the anode and cathode of said rectifier in series with a D.C. electric source, while external signals being applied between the control electrode and cathode of said rectifier, a permanent magnet rotor rotatable in the magnetic field established by excitation of said field winding, starting means for imparting initial torque to said permanent magnet rotor at standstill, and a synchronizing circuit for applying a signal corresponding to the instantaneous rotating frequency of said permanent magnet rotor after its starting between the control electrode and cathode of said silicon control rectifier to flow a current corresponding to the instantaneous rotating frequency of said permanent magnet rotor through said field winding, whereby the rotating speed of said rotor is drawn into synchronism with the frequency of said external signal.

13. A synchronous motor comprising a field winding wound around stator field poles, a push-pull type switching circuit including a switching element, said field winding being connected direct to the output terminals of said switching element in series with a D.C. electric source, while external signals being applied to the control terminals of said switching element, a permanent magnet rotor rotatable in the magnetic field established by excitation of said field winding, starting means for imparting initial torque to said permanent magnet rotor at standstill, and a synchronizing circuit for applying a signal corresponding to the instantaneous rotating frequency of said permanent magnet rotor after its starting to the control terminals of said switching element to flow a current corresponding to the instantaneous rotating frequency of said permanent magnet rotor through said field winding, whereby the rotating speed of said rotor is drawn into synchronism with the frequency of said external signal.

14. A synchronous motor comprising a field winding wound around stator field poles, a flip-flop circuit including a switching element, said field winding being connected direct to the output terminals of said switching element in series with a D.C. electric source, while external signals being applied to the control terminals of said switching element, a permanent magnet rotor rotatable in the magnetic field established by excitation of said field winding, starting means for imparting initial torque to said permanent magnet rotor at standstill, and a synchronizing circuit for applying a signal corresponding to the instantaneous rotating frequency of said permanent magnet rotor after its starting to the control terminal of said switching element to flow a current corresponding to the instantaneous rotating frequency of said rotor through said field winding, whereby the rotating speed of said rotor is drawn into synchronism with the frequency of said external signal.

15. A synchronous motor comprising stator field poles, a field winding wound therearound and having a mid tap free to change over, at least a set of switching circuits including a switching element, said field winding being connected directly to the output terminals of said switching element in series with a D.C. electric source, while external signals being applied to the control terminals of said switching element, a permanent magnet rotor rotatable in the magnetic field established by excitation of said field winding, starting means for imparting initial torque to said permanent magnet rotor at standstill, and a synchronizing circuit for applying a signal corresponding to the instantaneous rotating frequency of said permanent magnet rotor after its starting to the control terminals of said switching element to flow a current corresponding to the instantaneous rotating frequency of said rotor through said field winding by way of said mid tap, whereby the rotating speed of said rotor is drawn into synchronism with the frequency of said external signal.

References Cited by the Examiner
UNITED STATES PATENTS 2,995,690 8/1961 Lemon _____ 318—138
3,124,735 3/1964 Fenemore _____ 318—138

ORIS L. RADER, *Primary Examiner.*

C. E. ROHRER, *Assistant Examiner.*